(12) United States Patent
Gaul et al.

(10) Patent No.: US 8,446,033 B1
(45) Date of Patent: May 21, 2013

(54) SAVONIUS ROTOR WIND POWER GENERATOR SYSTEM AND METHOD

(76) Inventors: Roy D. Gaul, Houston, TX (US);
Claude P. Brancart, Brunswick, ME (US); Vincent L. Gaul, Robinson, IL (US)

( * ) Notice: Subject to any disclaimer, the term of this patent is extended or adjusted under 35 U.S.C. 154(b) by 407 days.

(21) Appl. No.: 12/703,191

(22) Filed: Feb. 9, 2010

Related U.S. Application Data

(60) Provisional application No. 61/150,824, filed on Feb. 9, 2009.

(51) Int. Cl.
*F03D 7/00* (2006.01)

(52) U.S. Cl.
USPC .......................................... 290/55; 416/223 R

(58) Field of Classification Search
USPC ............................................................ 290/55
See application file for complete search history.

(56) References Cited

U.S. PATENT DOCUMENTS

| | | | |
|---|---|---|---|
| 206,631 A * | 7/1878 | Smith | 416/117 |
| 1,697,574 A * | 1/1929 | Savonius | 416/110 |
| 1,766,765 A | 6/1930 | Savonius | |
| 4,005,947 A | 2/1977 | Norton et al. | |
| 4,061,926 A | 12/1977 | Peed | |
| 4,177,009 A | 12/1979 | Baum, Sr. et al. | |
| 4,359,311 A | 11/1982 | Benesh | |
| 4,784,568 A | 11/1988 | Benesh | |
| 4,830,570 A | 5/1989 | Benesh | |
| 4,832,569 A * | 5/1989 | Samuelsen et al. | 416/17 |
| 4,838,757 A | 6/1989 | Benesh | |
| 5,494,407 A | 2/1996 | Benesh | |
| 6,283,711 B1 | 9/2001 | Borg et al. | |
| 6,345,957 B1 | 2/2002 | Szpur | |
| 6,666,650 B1 * | 12/2003 | Themel | 416/200 R |
| 6,910,873 B2 * | 6/2005 | Kaliski | 418/267 |
| 6,984,899 B1 * | 1/2006 | Rice | 290/44 |
| 7,220,107 B2 | 5/2007 | Kaneda | |
| 7,235,893 B2 * | 6/2007 | Platt | 290/54 |
| 7,352,076 B1 | 4/2008 | Gabrys | |
| 7,393,177 B2 | 7/2008 | Rahai et al. | |
| 2002/0034437 A1 * | 3/2002 | Williams | 415/1 |
| 2004/0042899 A1 * | 3/2004 | Khan | 416/51 |
| 2004/0086373 A1 * | 5/2004 | Page, Jr. | 415/4.2 |
| 2011/0176919 A1 * | 7/2011 | Coffey | 416/124 |

FOREIGN PATENT DOCUMENTS

| | | | |
|---|---|---|---|
| JP | 2001289150 A | * | 10/2001 |
| KR | 2004024956 A | * | 3/2004 |
| SU | 859676 B | * | 8/1981 |

\* cited by examiner

*Primary Examiner* — Joseph Waks
(74) *Attorney, Agent, or Firm* — Kenneth A. Roddy

(57) ABSTRACT

A Savonius rotor wind power generator system and method utilizes a large diameter rotor increased in sized to produce a proportional decrease of the rotation rate while the peripheral speed remains constant. The large diameter rotor operating at low rotation rates (less than 10 rpm) produces high torque, and electrical power is generated by means of a multiplicity of generators positioned around its periphery that are sized and have gear ratios matched to selectable ranges of wind speed to allow efficient automated electrical power generation over a range of wind speeds from about three meters per second to more than 40 meters per second. The arrangement, sizing, and control of these generators enable production of synchronous AC power generation over a much larger range of wind speeds than can be achieved with conventional horizontal axis turbines.

3 Claims, 5 Drawing Sheets

Section A-A

Section B-B

Detail "A"

Detail "B"

SAVONIUS ROTOR WIND POWER GENERATOR SYSTEM AND METHOD

CROSS REFERENCE TO RELATED APPLICATION

This application claims priority of U.S. Provisional Application Ser. No. 61/150,824, filed Feb. 9, 2009.

BACKGROUND OF THE INVENTION

1. Field of the Invention

This invention relates generally to alternative sources of energy using wind driven electricity generation and, more particularly to a system and method utilizing a Savonius type wind turbine rotor for generating electrical power from wind energy.

2. Background Art

Published prior art since 1924 encompasses the fundamental characteristics and physical behavior of the wing rotor invented by Sigurd J. Savonius. Savonius was granted British Patent GB 244414 in 1926, British Patent GB 299634 in 1928, and U.S. Pat. No. 1,766,765 in 1930. His original work (Savonius, S. J., "The Wing-Rotor in Theory and Practice," Self published by Savonius & CO., Helsingfors, Finland, 39 pp., 1925) summarizes eight months of experiments with about 40 models of various sizes, forms and wing types. The original analysis, summarized in an article (Savonius, S. J., "The S-Rotor and its Applications," *Mechanical Engineering*, vol. 53, no. 5, pp. 333-8, May 1931), provided an estimate of peak efficiency (31%), as well as loading and rotation properties, that is consistent with numerous subsequent studies. Primary emphasis of many of these studies was on measurements of power conversion efficiency and confirmation of rotor operating properties that had been articulated by the inventor Savonius.

The overwhelming international attention during the 20$^{th}$ century to inverse propeller driven horizontal axis wind turbines (HAWTs) has relegated the variants of the vertical axis Savonius rotor to academic curiosity. The lack of interest and incentive for applying the Savonius rotor to power generation of more than a few kilowatts is partly attributable to a historical accident wherein two efficiency curves were incorrectly labeled in a published article concerning the rotor which led to the misimpression that the rotor has relatively low efficiency.

Many alternatives and wind energy conversion applications have been suggested to increase rotor performance by means of vane configuration, external appurtenances, and other mechanisms. The following are some examples: Savonius, U.S. Pat. No. 1,766,765; Norton et al, U.S. Pat. No. 4,005,947; Peed, U.S. Pat. No. 4,061,926; Baum, Sr., et al U.S. Pat. No. 4,177,009; Benesh, U.S. Pat. Nos. 4,359,311; 4,784,568; 4,830,570; 4,838,757; and 5,494,407; Borg et al, U.S. Pat. No. 6,283,711; Szpur, U.S. Pat. No. 6,345,957; Kaneda, U.S. Pat. No. 7,220,107; Gabys, U.S. Pat. No. 7,352,076; and Rahai et al, U.S. Pat. No. 7,393,177.

Of these studies and patents related to wind generation of electric power, none have contemplated rotor rotation rates and a mechanism for energy conversion that are comparable to the present invention. Most of the Savonius rotor wind generation systems of the prior art utilize a generator coupled to a single central shaft. However, the much lower rotation rate of the Savonius rotor markedly increases mechanical problems of single shaft power generation.

SUMMARY OF THE INVENTION

The present invention overcomes the aforementioned problems and is distinguished over the prior art in general, and these patents in particular by a Savonius rotor wind power generator system and method wherein the diameter of the Savonius rotor is significantly increased so as to produce a proportional decrease of the rotation rate while the peripheral speed remains constant. The large diameter rotor operating at low rotation rates (less than 10 rpm) produces high torque and electrical power is generated by means of a multiplicity of generators positioned around its periphery which are sized and have gear ratios matched to selectable ranges of wind speed to allow efficient automated electrical power generation over a range of wind speeds from about three meters per second to more than 40 meters per second. The arrangement, sizing, and control of these generators enable production of synchronous AC power generation over a much larger range of wind speeds than can be achieved with conventional horizontal axis turbines.

One of the significant features and advantages of the present Savonius rotor wind power generator system and method is that it can compete directly with horizontal axis wind turbines and is capable of superior power generation at much higher wind speeds.

Another significant feature and advantage of the present Savonius rotor wind power generator system and method is that it can provide synchronous AC power without the necessity of DC to AC conversion.

Another significant feature and advantage of the present Savonius rotor wind power generator system and method is that the system is automated such that centralized monitoring and control of widely separated unmanned plants will be practical.

Another significant feature and advantage of the present Savonius rotor wind power generator system and method is that it does not require control surfaces or movement of the vanes to limit rotation rate in high winds. Contrary to horizontal axis systems, the rotation rate of the present rotor is acceptably self-limiting in the range of maximum wind speeds that occur in severe storms.

Another significant feature and advantage of the present Savonius rotor wind power generator system and method is that the systems are compatible with, and configured for, operation on buildings where there is a concentration of power consumption.

Further significant features and advantages of the present Savonius rotor wind power generator system and method is that, unlike highly developed horizontal axis wind turbines, the present vertical axis Savonius rotor systems are quieter (noise from both vanes and generators); pose no danger to birds in flight; can be easily maintainable by ground crews; have a greater tolerance for storm conditions; operate more efficiently in gusty winds; and are less costly to own and operate.

A still further significant feature and advantage of the present Savonius rotor wind power generator system and method is that the configuration of the power plant is compatible with urban and commercial installation and is visually acceptable to the general populace.

Other significant features and advantages of the invention will become apparent from time to time throughout the specification and claims as hereinafter related.

DESCRIPTION OF THE PREFERRED EMBODIMENT

In order to appreciate the significant differences and advantages of the present invention, an example of a conventional prior art two tier vertical axis Savonius rotor will first be described with reference to FIGS. 1 and 1A, followed by a detailed description of the preferred embodiments of the present invention.

Figure 1A:
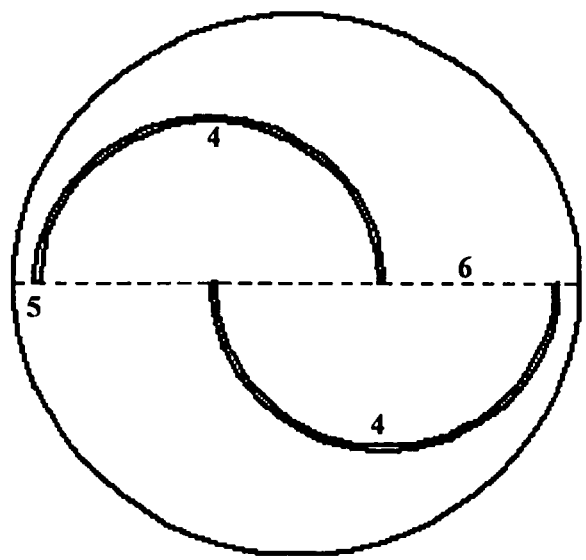
FIG. 1A is a transverse cross sectional view of the conventional prior art two tier vertical axis Savonius rotor taken along line A-A of FIG. 1.
Figure 1:
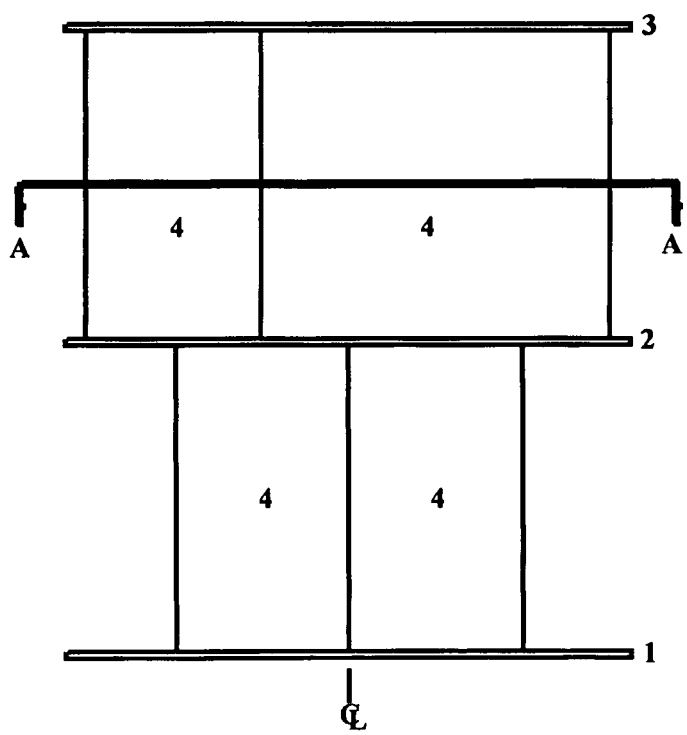
FIG. 1 is a side elevation view of a conventional two tier vertical axis Savonius rotor of the prior art.

Referring to FIGS. 1 and 1A, by numerals of reference, there is shown a conventional two-tier vertical axis Savonius rotor configuration. The lower tier comprises a pair of semicircular vanes 4 disposed between a bottom horizontal circular plate 1 and a middle horizontal circular plate 2. The upper tier comprises two semicircular vanes 4 disposed between the middle horizontal circular plate 2 and an upper horizontal circular plate 3. The vanes 4 are arranged such that their tips 5 are on a line through the center of the circular plates which is the vertical axis of rotation of the rotor. The alignment of the pair of vanes in one tier is at a 90° horizontal angle relative to the vanes in the other tier.

The vane configuration of the present invention (discussed in more detail below) is similar to the conventional two-tier vertical axis Savonius rotor configuration described above, but has a gap 6 between the overlapping vanes which is of a width equal to the vane radius such that the total diameter (wing spread) of the pair of vanes is 1.5 times the vane diameter. However, it should be understood that other embodiments of the present invention can employ variations in vane and overall rotor configuration as well as employ all manner of appurtenances to enhance performance.

Figure 2:
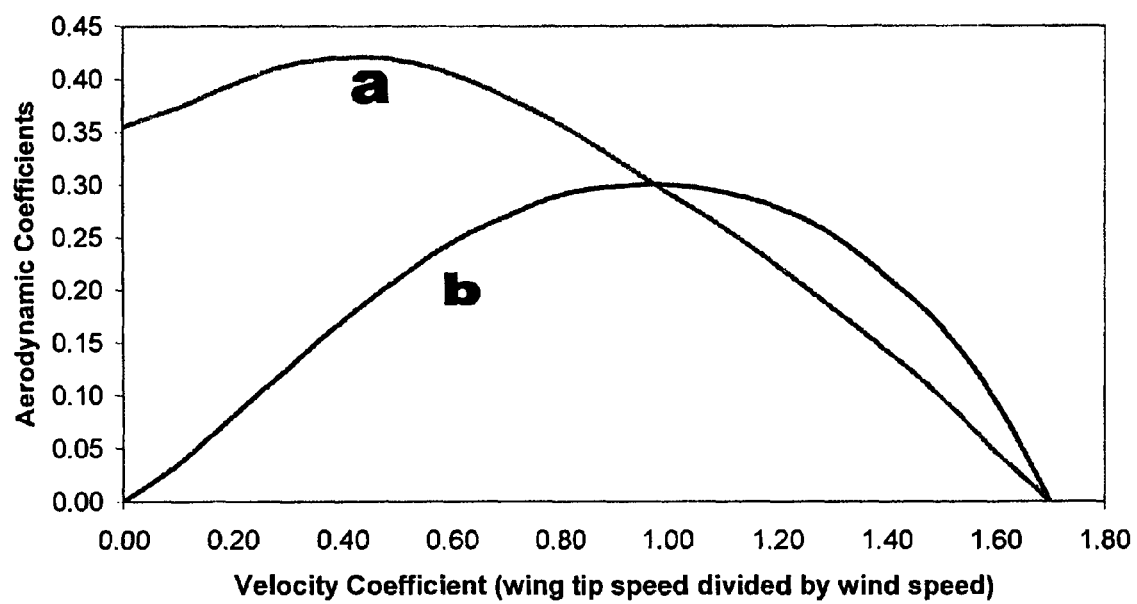
FIG. 2 is a graph illustrating the torque and efficiency properties of the conventional prior art two tier vertical axis Savonius rotor.

FIG. 2 is a graph illustrating the torque a and efficiency b properties of the conventional two-tier vertical axis Savonius rotor that are used for calculations relevant to the preferred embodiment of the present invention in the estimates of power versus wind speed for a selection of rotor sizes and configurations. A significant technical difference between the vertical axis wind turbine (VAWTs) and horizontal axis wind turbine (HAWTs) systems is their ratios of vane tip speed to wind speed (velocity coefficients). The velocity coefficient for horizontal axis wind turbines typically is in the range of 3-7 versus 0.5-1.5 for the vertical axis Savonius rotor. Other factors of fundamental importance to the present invention are high torque at low velocity coefficients and a maximum unloaded rotation rate at a velocity coefficient of about 1.6.

The present invention does not require control surfaces or movement of the vanes to limit rotation rate in high winds.

Figure 3:
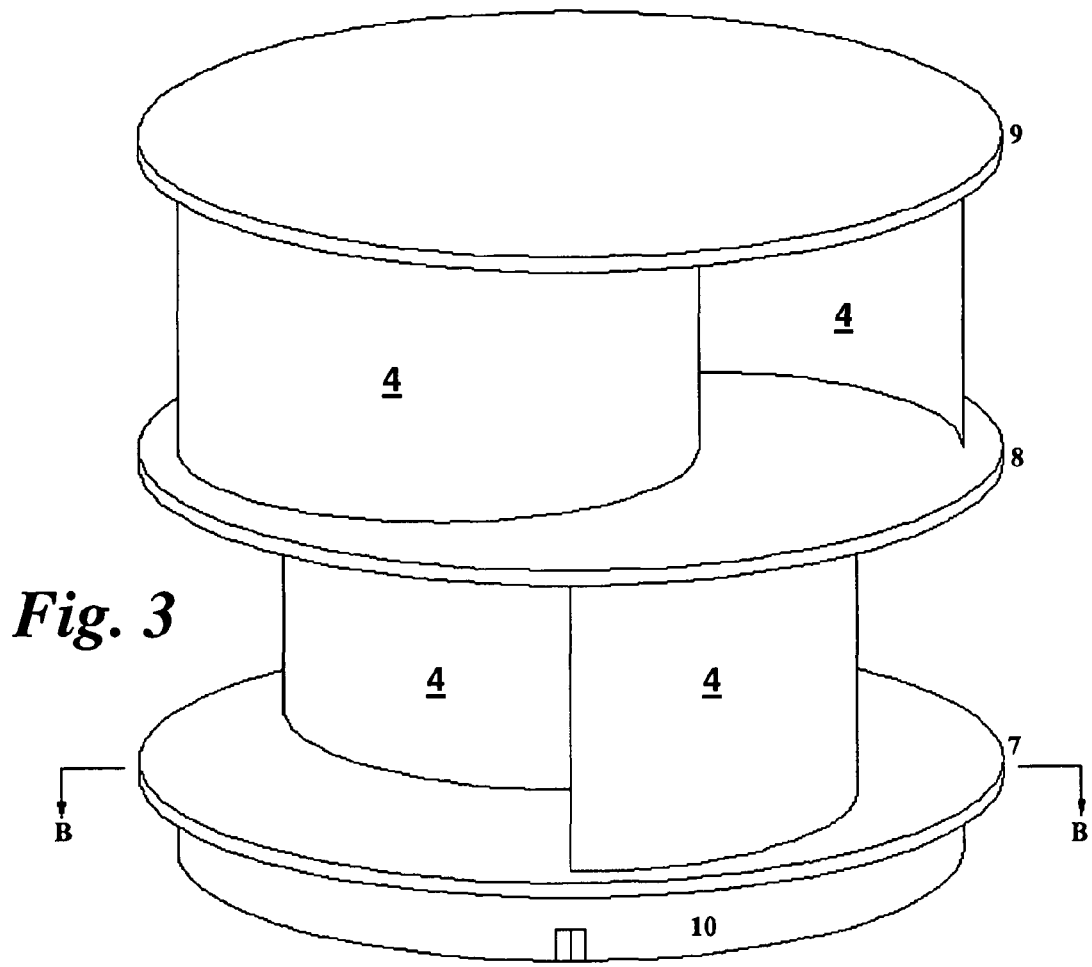
FIG. 3 is a perspective view of the two tier vertical axis Savonius rotor apparatus in accordance with the present invention.

Referring now to FIG. 3, the two-tier vertical axis Savonius rotor apparatus in accordance with the present invention is shown somewhat schematically. The present Savonius rotor apparatus comprises a pair of semicircular vanes 4 disposed between a bottom horizontal circular plate or platform 7 and a middle horizontal circular plate or platform 8. The upper tier comprises two semicircular vanes 4 disposed between the middle horizontal circular plate 2 and an upper or top horizontal circular plate or platform 9. The vanes 4 are arranged such that their tips 5 are on a line through the center of the circular plates which is the vertical axis of rotation of the rotor. The alignment of the pair of vanes in one tier is at a 90° horizontal angle relative to the vanes in the other tier. In a preferred embodiment, as discussed previously, there is a gap 6 between the overlapping vanes 4 (FIG. 1A) which has a width equal to the vane radius such that the total diameter (wing spread) of the pair of vanes is 1.5 times the vane diameter.

Figure 3A:
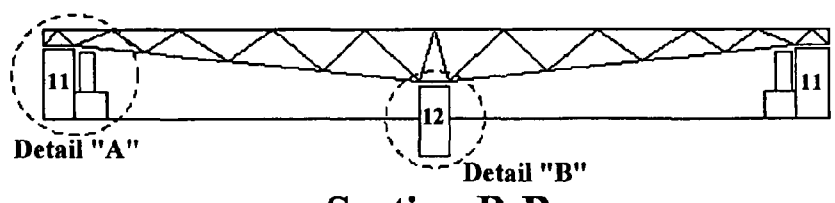
FIG. 3A is a transverse cross sectional view of the lower portion of the present two tier vertical axis Savonius rotor taken along line B-B of FIG. 3, showing, somewhat schematically, the base platform and skirt arrangement at ground level.
Figure 3C:
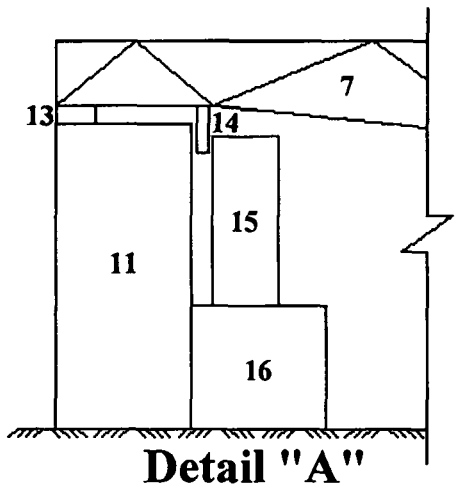
FIG. 3C is a partial cross sectional view showing, somewhat schematically, the central portion of the base platform and vertical shaft at the center of rotation in greater detail.
Figure 3B:
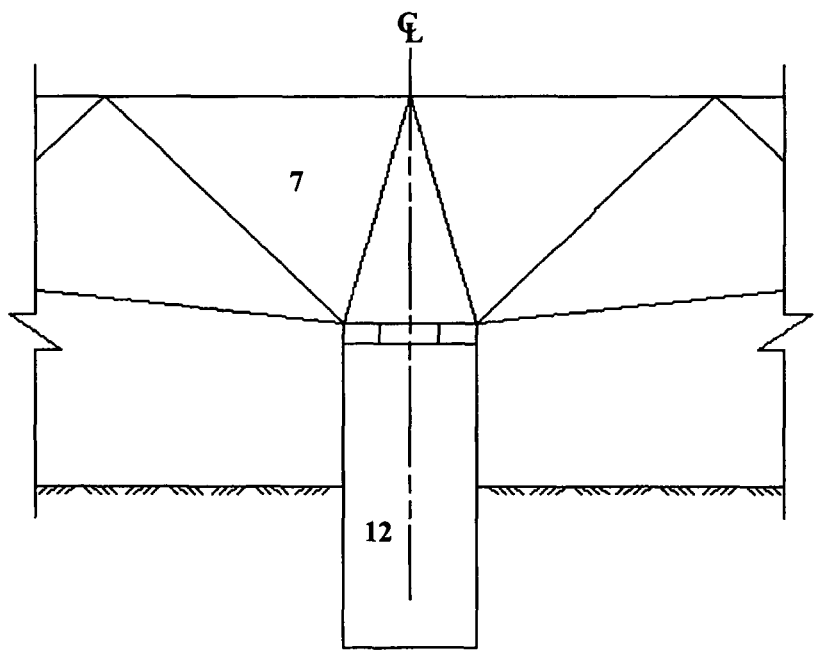
FIG. 3B is a cross sectional view showing, somewhat schematically, the base platform and skirt arrangement in greater detail.

Referring additionally to FIGS. 3A, 3B and 3C, the rotor is mounted on a vertical shaft 12 at the center of rotation, and the peripheral underside of the bottom platform 7 is disposed above the top surface of a circular ring base structure 10, 11.

The underside of the lower platform 7 of the rotor slopes upward towards the periphery where its perimeter surface is slightly above the base ring structure 11 that forms an enclosure beneath the rotor. A bearing surface 13 is located between the top of base ring structure 11 and the peripheral underside of the bottom platform 7. A continuous circular skirt 14 is disposed on the underside of the bottom platform 7 inwardly from the outer periphery of the bottom platform. A plurality of generators 15 are positioned circumferentially at selected locations around the interior of the ring structure 11 and are mounted by any of several conventional means to couple with an appropriately configured mechanism on the inner vertical surface of the peripheral skirt 14 of the rotor so as to have their shafts turned by the rotation of the rotor. Accessory and control equipment is distributed in compartments 16 at convenient locations in the interior of the ring structure 11 as dictated by design and the nature of the service connections for electrical supply.

The present Savonius rotor has a very large diameter in the range of from about 30 to about 50 meters, for example, but not limited thereto. A physical property of the Savonius rotor is that for optimized power production, the peripheral speed of the rotor is proportional to the wind speed. Therefore, increase in diameter of a rotor produces a proportional decrease of the rotation rate while the peripheral speed remains constant. In other words, the rotation rate is inversely proportional to diameter. Because of the dependence of peripheral speed solely on wind speed, the present system provides a multiplicity of generators 15 to enable performance over a broad range of wind speeds. For example, the large diameter of the present rotor operates at rotation rates, less than 10 rpm at wind speeds up to 45 mph., to produce high torque, and the plurality of generators 15 positioned around the rotor periphery are sized and have gear ratios matched to selectable ranges of wind speed to provide efficient automated electrical power generation over a range of wind speeds from about 3 meters per second to more than 40 meters per second. Systems of the present invention that have diameters in the range of 30-40 meters (100-130 feet) and rotate at less than 10 rpm in wind speeds up to 45 mph have capacities up to about 500 kW at moderate wind speeds. It should be understood that higher capacity units will have larger diameters and lower rotation rates.

The vast majority of the existing U.S. wind farms are populated by horizontal axis wind turbine (HAWTs) units with maximum power rating of 1.5 megawatts (MW) at and above a wind speed of 25 mph.

Figure 4:
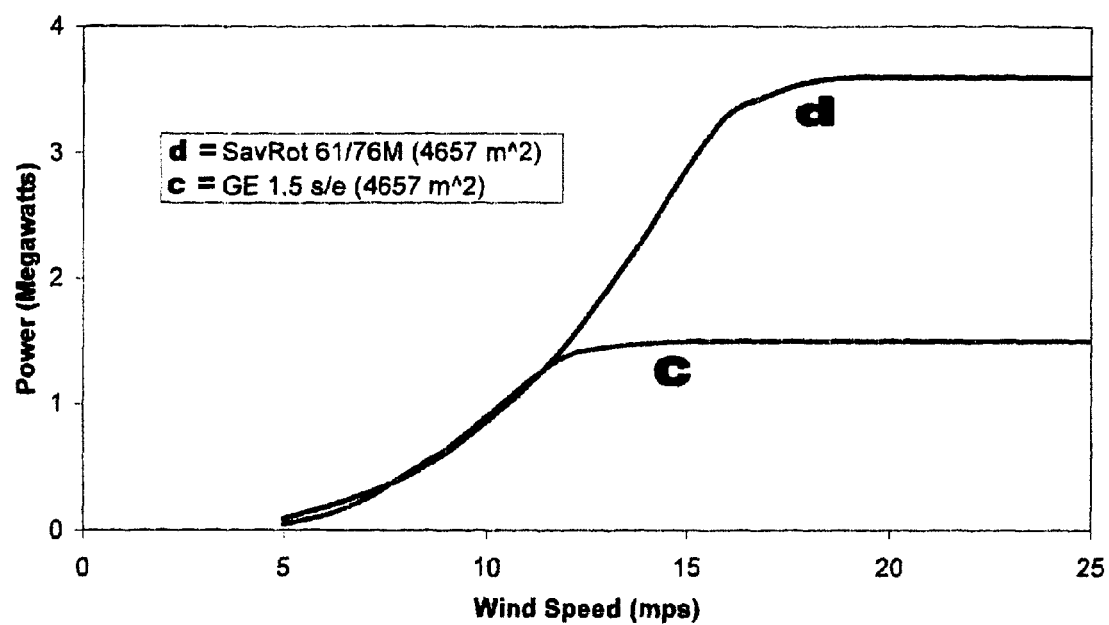
FIG. 4 is a graph illustrating a comparison of the calculated performance of a conventional prior art 1.5 MW horizontal axis wind turbine and the present two tier vertical axis Savonius rotor system.

The graph of FIG. 4 shows a comparison of calculated performance for a typical 1.5 MW horizontal turbine c and a preferred embodiment of the present Savonius rotor system d. For purposes of illustration and performance calculations, an example of the preferred embodiment of the present invention has been given overall rotor dimensions of 61 meters in diameter and 76 meters in height. The circular swept area of the turbine blades and the projected vertical area (wing spread times height) of the Savonius rotor are equivalent for purposes of applying coefficients for torque and efficiency.

FIG. 4 shows that the generating capability of the two units is equivalent up to a wind speed of about 11 meters per second, or approximately 25 mph. At winds above about 15 meters per second, or approximately 30 mph the conventional horizontal axis turbine power output is constant at its rated capacity of 1.5 MW. The power production of the present invention can continue to escalate as wind speed increases. For purposes of this example, the maximum output of the preferred embodiment is arbitrarily limited to 3.6 MW for wind speeds above about 20 meters per second, or approximately 45 mph. The capability of the preferred embodiment to operate at the higher wind speeds is limited only by total capacity of the multiple generators and the strength of the rotor structure.

The rotation rate and power management of the rotor in high wind conditions can be accomplished by any of several means: (a) power generation and loading; (b) unloading to allow the rotor to "free wheel"; (c) adjustment of the central gap between the overlapping vanes; (d) use of external appurtenances to restrict fluid flow into the rotor cavity; and (e) braking by means of mechanical or other resistive devices.

The preferred embodiment of the present invention does not require control surfaces, movement of the vanes, external appurtenances, or braking to limit rotation rate for survival in high winds.

The plurality of generators of selected ratings distributed around the periphery of the rotor provide a means for: (a) acoustic isolation; (b) electric power generation; (c) resistive torque for rotation rate control; (d) low resistance for power generation in light airs; (e) adjustment of capacity for high wind speeds; (f) control of rotor speed to generate usable AC power at a prescribed frequency; (g) ground level access for repair, maintenance and upgrade; (h) redundancy and flexibility for operations and control; and (i) efficient and reliable coupling between generators and the rotor.

The peripheral base structure at ground level provides a means for: (a) controlled access to components beneath the rotor; (b) enclosed housing of generation, control, and support equipment; (c) mounting of generation equipment; and (d) access to the periphery of the lower platform. The previously described bottom horizontal circular plate or platform 7 disposed slightly above the top surface of the circular ring base structure 11, and the bearing surface 13 between the base ring structure and the periphery of the bottom platform 7 provides a continuous horizontal surface at a constant elevation to produce a vertical restoring force to counteract the overturning moment created by the horizontal force of the wind acting on the rotor. Under calm conditions and low wind speeds, the underside of the rotor platform 7 does not make contact with the base structure 11. At higher wind speeds, the underside of the bottom horizontal circular platform 7 engages the bearing surface 13 between the base ring structure 11 and the bottom platform with minimal horizontal friction.

Rotor efficiency during operation in the natural turbulent wind field is maximized by the scale of the rotor and its capture of energy irrespective of shifts in wind direction.

Synchronous power generation is achievable by means of electrical load control augmented, as necessary to meet line quality requirements, with conventional electrical power conversion techniques. The plurality of generators can be staged and controlled for maximum power generation at various rotor speeds. The DC power generated at very low wind velocities may be stored in a battery storage system to maintain power for controls and maintenance utilities. The present system may also be equipped with predictive maintenance capabilities utilizing SCADA type controls (supervisory control and data acquisition) for monitoring and alarming events remotely for high uptime of equipment.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A vertical axis Savonius rotor wind turbine comprising:
a lower tier having a first pair of semicircular vanes disposed vertically between a lower horizontal circular platform and an intermediate horizontal circular platform;
an upper tier having a second pair of semicircular vanes disposed vertically between said intermediate horizontal circular platform and an upper horizontal circular platform;
each pair of said semicircular vanes disposed such that their tip ends are on a horizontal line through the center of said circular platforms and said first pair of vanes in one said tier is at a 90° horizontal angle relative to said pair of vanes in the other said tier, each pair having opposed facing concave vane surfaces that channel air flow from one vane to the other to produce torque and rotate said rotor about a central vertical axis; and
each of said semicircular vanes of each pair is disposed in opposed overlapped spaced relation to define a gap between the overlapping vane tip ends which is of a width equal to the vane radius such that the total diameter of said pair of vanes is approximately 1.5 times the vane diameter;
said lower horizontal circular platform rotatably mounted on a vertical shaft at the center of rotation;
a continuous circular skirt disposed on the underside of said lower platform inwardly from the outer periphery of said lower platform;
a circular ring base structure beneath said lower platform including a bearing surface disposed in spaced relation to said underside of said lower platform so as to engage said underside with minimal friction and produce a vertical counteracting force against deflection of said rotor caused by overturning moments due to horizontal wind speeds of sufficient force acting on said rotor; and a plurality of electrical generators positioned circumferentially at selected locations around the underside of said lower platform engaged with said skirt so as to have their shafts turned by rotation of the rotor, said generators intermittently and selectively coupled to optimize electrical power generation relative to the peripheral speed of said rotor skirt and the torque produced by said rotor.

2. The vertical axis Savonius rotor wind turbine according to claim 1, wherein said rotor has a diameter of at least 30 meters.

3. The vertical axis Savonius rotor wind turbine according to claim 1, wherein said plurality of generators are sized and have gear ratios matched to selectable ranges of wind speed and intermittently and selectively coupled to provide automated electrical power generation over a range of wind speeds from about three meters per second to more than forty meters per second.

\* \* \* \* \*